(12) United States Patent
Wadle et al.

(10) Patent No.: US 11,497,228 B2
(45) Date of Patent: Nov. 15, 2022

(54) MICROCHANNEL FREEZING CYLINDER ASSEMBLY

(71) Applicant: TAYLOR COMMERCIAL FOODSERVICE, LLC, Rockton, IL (US)

(72) Inventors: Stephen M. Wadle, Beloit, WI (US); James J. Minard, Roscoe, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 346 days.

(21) Appl. No.: 16/735,046

(22) Filed: Jan. 6, 2020

(65) Prior Publication Data

US 2020/0221725 A1 Jul. 16, 2020

Related U.S. Application Data

(60) Provisional application No. 62/793,101, filed on Jan. 16, 2019.

(51) Int. Cl.
*A23G 9/04* (2006.01)
*A23G 9/22* (2006.01)

(52) U.S. Cl.
CPC .............. *A23G 9/045* (2013.01); *A23G 9/222* (2013.01)

(58) Field of Classification Search
CPC ........ A23G 9/045; A23G 9/222; A23G 9/281; A23G 9/22; A23G 9/16; F28D 7/103; F28D 7/10; F28D 7/106; F28F 1/105; F28F 2260/02
See application file for complete search history.

(56) References Cited

U.S. PATENT DOCUMENTS

| | | | |
|---|---|---|---|
| 4,635,707 | A | 1/1987 | Gentry |
| 5,435,155 | A | 7/1995 | Paradis |
| 6,253,573 | B1 | 3/2001 | Schwitters et al. |
| 6,490,872 | B1 | 12/2002 | Beck et al. |
| 6,494,055 | B1 | 12/2002 | Meserole et al. |
| 6,553,779 | B1 | 4/2003 | Boyer et al. |

(Continued)

FOREIGN PATENT DOCUMENTS

| | | |
|---|---|---|
| EP | 1035387 | 9/2000 |
| WO | 2017/176580 A1 | 10/2017 |

(Continued)

OTHER PUBLICATIONS

Search Report & Written Opinion issued in Appl. No. PCT/US20/12662 (dated 2020).

(Continued)

*Primary Examiner* — Frantz F Jules
*Assistant Examiner* — Martha Tadesse
(74) *Attorney, Agent, or Firm* — Barnes & Thornburg LLP

(57) ABSTRACT

A microchannel freezing cylinder assembly is disclosed that includes an inner cylinder located within an outer cylinder. Multiple grooves are located on the exterior of the inner cylinder that form multiple microchannels when the inner cylinder is located within the outer cylinder. The inner cylinder includes an inlet header and a distribution header, with multiple orifices located in a ridge between the inlet header and distribution header. The distribution header is in fluid communication with the microchannels.

25 Claims, 10 Drawing Sheets

(56) References Cited

U.S. PATENT DOCUMENTS

| | | |
|---|---|---|
| 6,735,967 B1 | 5/2004 | Bischel et al. |
| 6,892,899 B2 | 5/2005 | Minard et al. |
| 6,948,327 B2 | 9/2005 | Bischel et al. |
| 6,986,441 B2 | 1/2006 | Scordato et al. |
| 7,014,076 B2 | 3/2006 | Minard et al. |
| 7,048,523 B2 | 5/2006 | Bush et al. |
| 7,191,824 B2 | 3/2007 | Wu et al. |
| 7,278,276 B2 | 10/2007 | Boyer et al. |
| 7,299,944 B2 | 11/2007 | Roady et al. |
| 8,474,515 B2 * | 7/2013 | Burgers ............... F28D 9/0018 165/157 |
| 8,714,410 B2 | 5/2014 | Wadle et al. |
| 9,487,383 B2 | 11/2016 | Minard et al. |
| 9,661,867 B2 | 5/2017 | Minard et al. |
| 9,765,891 B2 | 9/2017 | Bischel |
| 9,848,620 B2 | 12/2017 | Minard et al. |
| 9,903,495 B2 | 2/2018 | Matz et al. |
| 9,943,088 B2 | 4/2018 | Newton et al. |
| 10,194,678 B2 | 2/2019 | Bischel |
| 2008/0302818 A1 | 12/2008 | Minard et al. |
| 2010/0269534 A1 | 10/2010 | Kumakiri et al. |
| 2012/0104046 A1 * | 5/2012 | Wadle ..................... A23G 9/14 29/890.03 |
| 2014/0367424 A1 | 12/2014 | Newton |
| 2017/0042180 A1 | 2/2017 | Bush |
| 2017/0367370 A1 | 12/2017 | Frisque et al. |
| 2018/0206520 A1 | 7/2018 | Newton et al. |
| 2019/0000109 A1 | 1/2019 | Bischel |
| 2019/0056182 A1 | 2/2019 | Bischel et al. |
| 2019/0110498 A1 | 4/2019 | Minard |
| 2019/0337791 A1 | 11/2019 | Bush et al. |
| 2020/0221725 A1 | 7/2020 | Wadle et al. |

FOREIGN PATENT DOCUMENTS

| | | |
|---|---|---|
| WO | 2017/1766091 A1 | 10/2017 |
| WO | 2017/210151 A1 | 12/2017 |
| WO | 2017/214357 A2 | 12/2017 |
| WO | 2018/009640 A1 | 1/2018 |
| WO | 2018/071334 A1 | 4/2018 |
| WO | 2018/140716 A1 | 8/2018 |

OTHER PUBLICATIONS

Supplementary Search Report issued in Appl. No. EP20741594 (Oct. 13, 2021).

* cited by examiner

| NUMBER OF TEETH | 126 |
| DIAMETRAL PITCH (1/IN) | 31.104878 |
| PRESSURE ANGLE | 8.000° |
| STANDARD PITCH DIAMETER (IN) | 4.0508 |
| TOOTH FORM | HOBBED |
| WHOLE DEPTH (IN) | 0.0565 |
| FINISHED TOOTH THICKNESS AT PITCH DIAMETER REF. | 0.0388 |

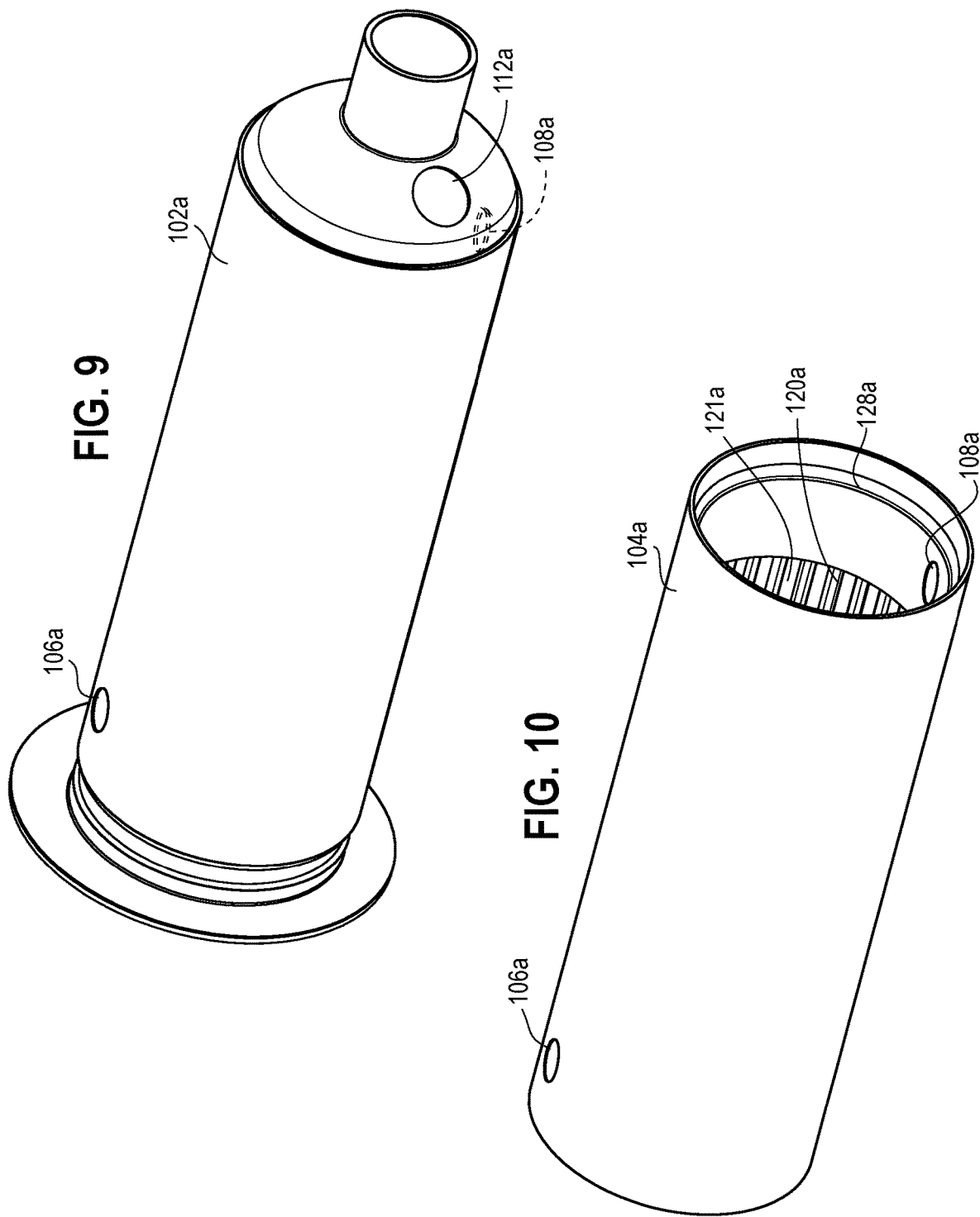

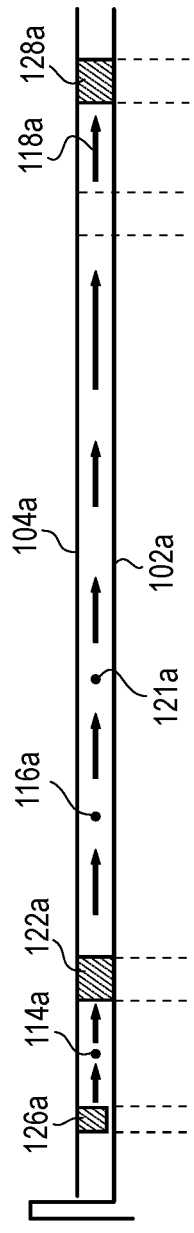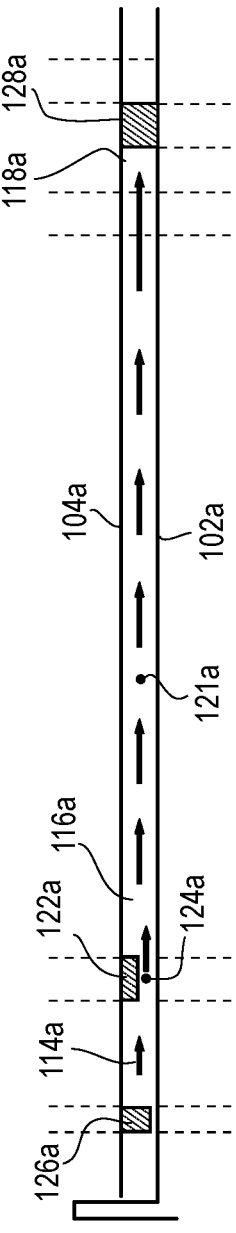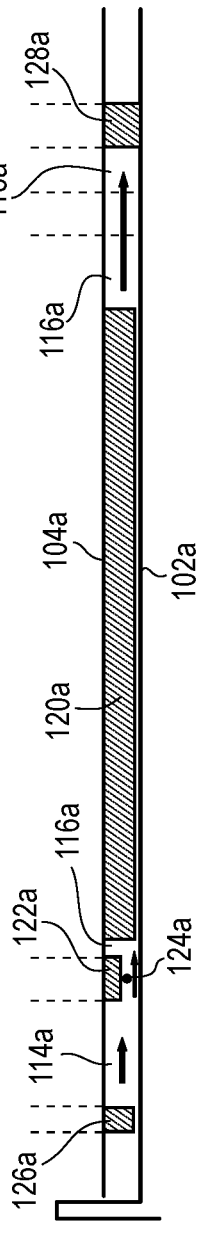

MICROCHANNEL FREEZING CYLINDER ASSEMBLY

CROSS-REFERENCE TO RELATED APPLICATIONS

This application claims priority from U.S. Provisional Application No. 62/793,101, filed on Jan. 16, 2019, the entirety of which is hereby fully incorporated by reference herein.

BACKGROUND

The present disclosure relates generally to freezing cylinder assemblies, and more particularly, to a microchannel freezing cylinder assembly used with a semi-frozen product dispensing apparatus.

Microchannel heat exchangers are used as evaporators in order to freeze dairy product for soft serve and shake production. Current technology utilizes an external distributor and multiple inlets and outlets in order to distribute the refrigerant to the microchannel flow paths. In the current technology there are typically six brazed joints on the distributor, four brazed joints on the freezing cylinder inlet, four joints on the freezing cylinder outlet, and four joints on the outlet header. This results in a total of 18 brazed joints.

SUMMARY

This disclosure relates to a microchannel freezing cylinder assembly that relocates the distribution mechanism from external to the freezing cylinder to within the freezing cylinder through the use of a pressurized header, several orifices, a second distribution header, and an outlet header. Refrigerant may enter an inlet header through a single inlet. The refrigerant may flow around the inlet header and pass from the inlet header to a distribution header through several orifices, such as 4 to 16 orifices. The refrigerant may flow from the distribution header to the microchannels that extend along the cylinder. This header and orifice design will ensure that refrigerant is distributed equally around the cylinder. The refrigerant may exit the microchannels into an outlet header within the cylinder. There may be a single outlet connection on the cylinder.

This disclosure moves the features which distribute and collect the refrigerant from outside the freezing cylinder to within the freezing cylinder. This design reduces the number of inlet connections on the freezing cylinder, such as from 10 to 1. The number of outlets on the freezing cylinder may be reduced from 8 to 1. The external distributor at the inlet and header at the outlet of the freezing cylinder will be eliminated with this design. This disclosure may reduce the cost to build the product through a reduction in the number of brazed joints and elimination of the external distributor and collector. This design may also improve the reliability through joint reduction.

This disclosure includes a freezing cylinder for use in a semi-frozen product dispensing apparatus, the freezing cylinder with an inner cylinder having an inlet end and an outlet end; an outer cylinder having an inlet end and an outlet end, wherein the outer cylinder is disposed coaxially over the inner cylinder; a plurality of microchannels on an exterior surface of the inner cylinder that extend parallel with a longitudinal axis of the inner cylinder, wherein the plurality of microchannels are located between the inner cylinder and outer cylinder; a first inlet header around the circumference of the inner cylinder, wherein the first inlet header is located near the inlet end of the inner cylinder; a second inlet header around the circumference of the inner cylinder, wherein the second inlet header is located between the first inlet header and the plurality of microchannels, wherein the second inlet header is in fluid communication with the plurality of microchannels; a header ridge located between first inlet header and the second inlet header, wherein the header ridge is configured to prevent fluid to flow from the first inlet header to the second inlet header; a plurality of orifices in the header ridge that are configured to allow fluid to flow from the first inlet header to the second inlet header; and an outlet header around the circumference of the inner cylinder, wherein the outlet header is located near the outlet end of the inner cylinder, wherein the outlet header is in fluid communication with the plurality of microchannels.

This disclosure includes a method of cooling a product with the freezing cylinder including the steps of providing a product to be cooled in an interior of the inner cylinder; adding refrigerant to the first inlet header through an inlet opening in the outer cylinder; moving refrigerant from the first inlet header to the second inlet header through the plurality of orifices; moving refrigerant from the second inlet header to the outlet header through the plurality of microchannels; and cooling the product by transferring heat from the product to the coolant as the refrigerant moves through the plurality of microchannels.

BRIEF DESCRIPTION OF THE DRAWINGS

FIG. 9 is a perspective for an inner cylinder of the embodiment of FIG. 8;

FIG. 10 is a perspective view of the outer cylinder of the embodiment of FIG. 8;

FIG. 13 is a cross-sectional view of section A-A of FIG. 8, a section that is aligned with the ridge and a microchannel to prevent flow across the ridge at that section, but allow flow through the microchannel;

FIG. 14 is a cross-sectional view of section B-B of FIG. 8, a section that is aligned with an orifice through the ridge and a microchannel to allow flow across the ridge at that section, and allow flow through the microchannel; and FIG. 15 is a cross-sectional view of section C-C of FIG. 8, a section that is aligned with an orifice through the ridge and a groove along the section to allow flow across the ridge at that section, but prevent flow across the reminder of the inner surface of the second cylinder.

DETAILED DESCRIPTION

Figure 1:
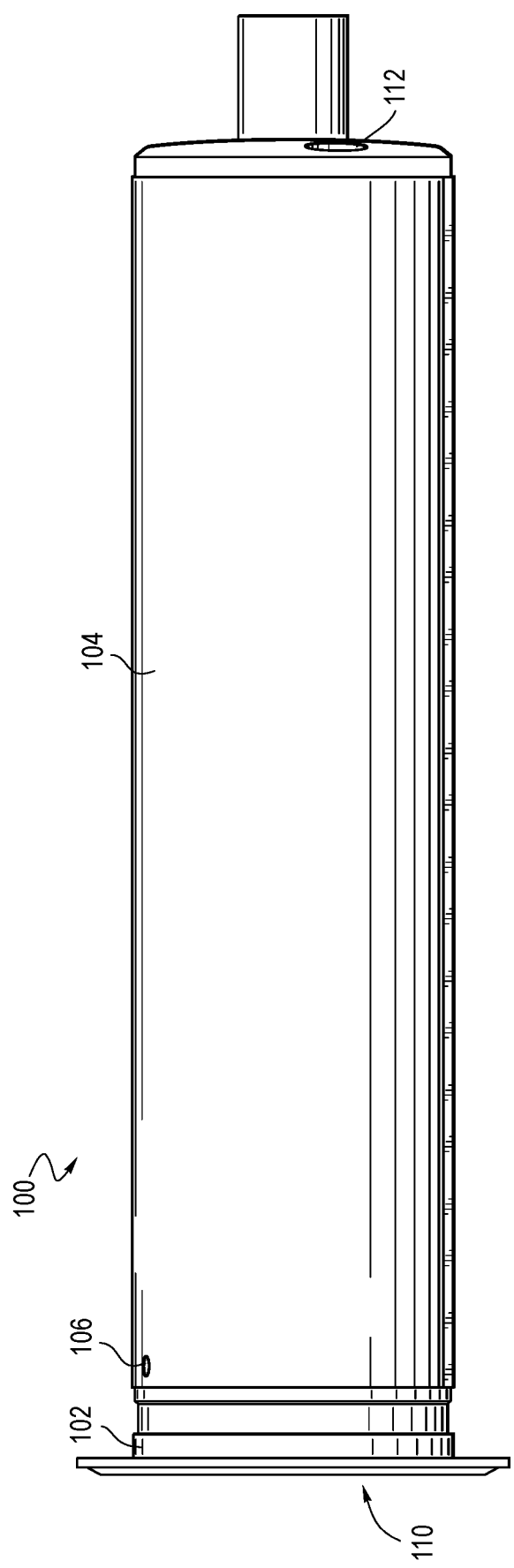
FIG. 1 is a perspective view of an embodiment of a microchannel freezing cylinder assembly.

Referring to the figures, a microchannel freezing cylinder assembly 100 used with a semi-frozen product dispensing apparatus (not shown) is shown in FIG. 1. The microchannel freezing cylinder assembly 100 includes a first cylinder 102 and a second cylinder 104. The second cylinder 104 may be disposed coaxially over the first cylinder 102. The second cylinder 104 may include a single inlet opening 106 and a single outlet opening 108 (shown in FIG. 2). The inlet opening 106 and outlet opening 108 may be located on generally opposite sides of the second cylinder 104. In one embodiment, the inlet opening 106 is located at the twelve o'clock position and the outlet opening 108 is located at the six o'clock position when viewing the assembly 100 from an axial end. In other embodiments, the inlet and outlet openings 106, 108 may be disposed to face in generally opposite directions, such as the inlet opening facing in a direction within a range of the ten o'clock position and the two o'clock position (inclusive of all positions within this range) while the outlet opening 108 may face in a direction with a range of the eight and four o'clock positions (inclusive of all positions within this range). In other embodiments, the inlet and outlet openings 106, 108 may both face in the same direction, or the same "general direction"—which is defined herein to be plus or minus one hour on a clock face. The inlet opening 106 and outlet opening 108 may also be located on opposite ends of the second cylinder 104.

First cylinder 102 may include an inner chamber configured to contain the semi-frozen product. The inner chamber may include a first inner chamber opening 110 and a second inner chamber opening 112. The refrigerant flowing in the microchannels may absorb heat from the semi-frozen product in the inner chamber and heat up and evaporate as it flows through the microchannels along the assembly 100. In this manner, the refrigerant and semi-frozen product may be in a heat exchange relationship such that the semi-frozen product is cooled.

Figure 2:
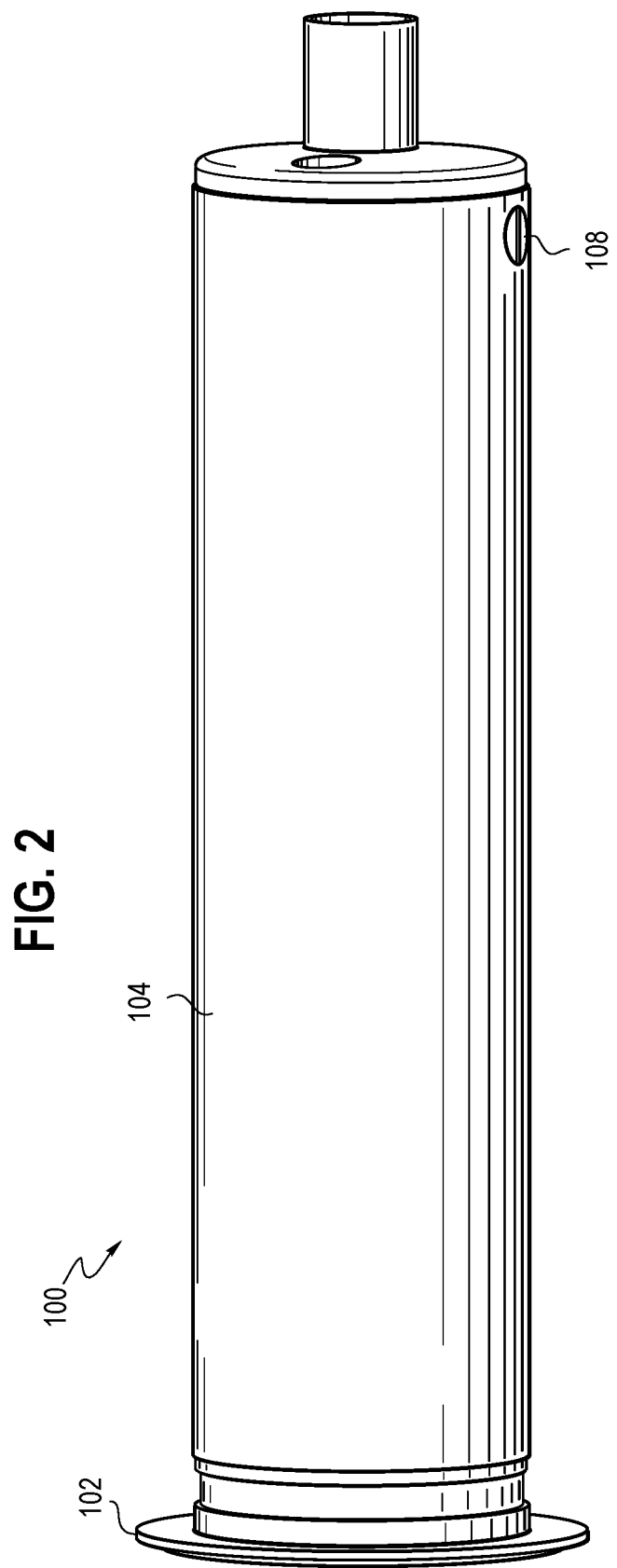
FIG. 2 is another perspective view of an embodiment of a microchannel freezing cylinder assembly.

FIG. 2 shows an assembly 100 that has been slightly rotated along the longitudinal axis from the view shown in FIG. 1. FIG. 2 shows outlet opening 108 in second cylinder 104 that is located on the opposite side from inlet opening 106. Outlet opening 108 may be located on the bottom to allow gravity to assist removing the refrigerant from the assembly 100.

Figure 3:
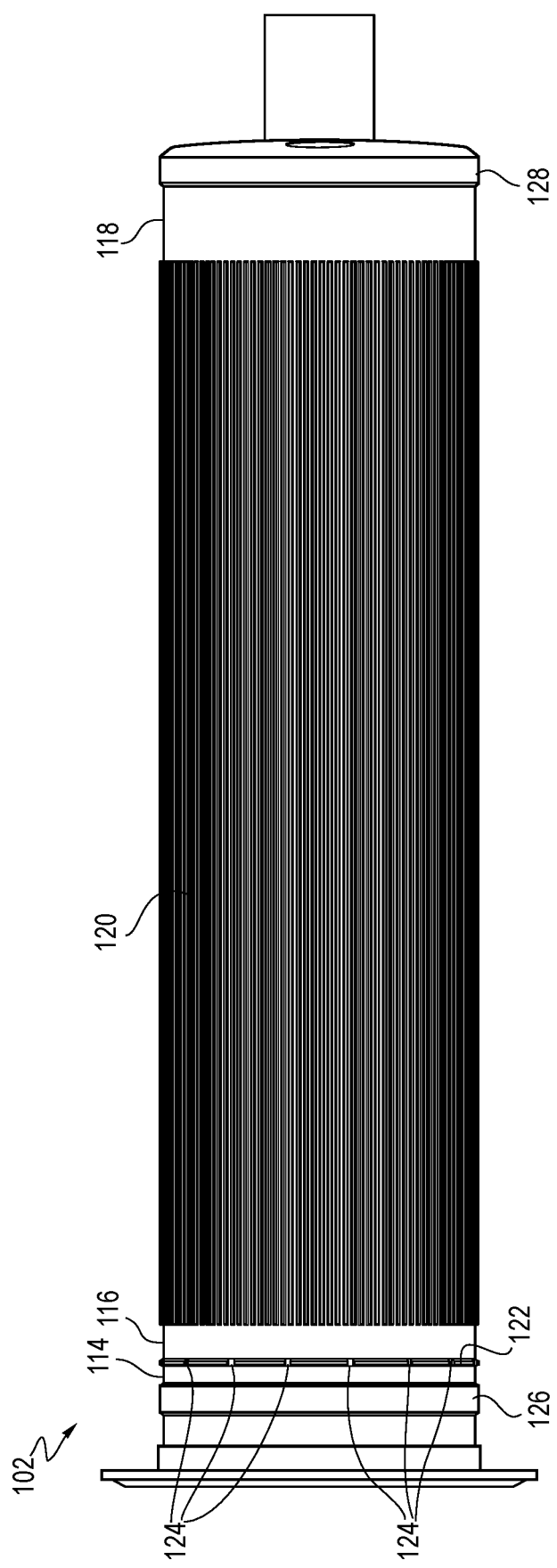
FIG. 3 is a side view of a component of an embodiment of a microchannel freezing cylinder assembly.

FIG. 3 shows first cylinder 102 without second cylinder 104. First cylinder 102 may include an inlet header 114, a distribution header 116, and an outlet header 118. Inlet opening 106 is in fluid communication with the inlet header 114 when the first cylinder 102 is located within the second cylinder 104. Outlet opening 108 is in fluid communication with the outlet header 118 when the first cylinder 102 is located within the second cylinder 104.

Figures 11, 12:
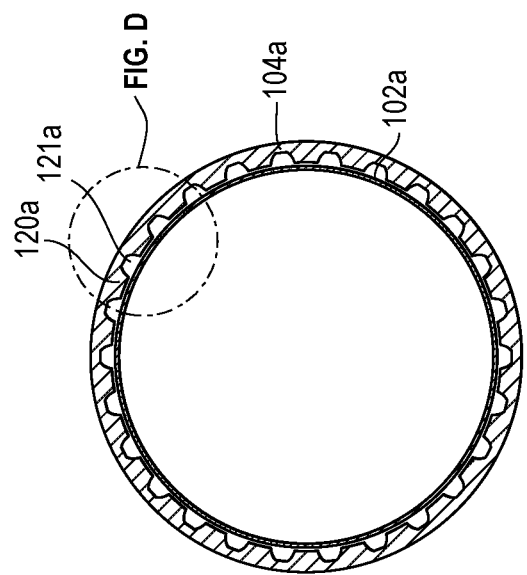
FIG. 11 is a cross-sectional view of section E-E of FIG. 8.
FIG. 12 is a detail view of detail D of FIG. 11.

First cylinder 102 may include several grooves 120 extending along the longitudinal length of first cylinder 102. When the second cylinder 104 is located coaxially over first cylinder 102, the grooves 120 may form the microchannels (similar to element 121a (FIGS. 10, 11, 15)) that contain the refrigerant. First cylinder 102 may include a ridge 122 located between the inlet header 114 and distribution header 116. Ridge 122 may include several orifices 124, for example 4 to 16 orifices 124.

Orifices 124 may allow refrigerant to flow from inlet header 114 to distribution header 116. The refrigerant may flow around the circumference of inlet header 114 and pass from the inlet header 114 to the distribution header 116 through orifices 124. The pressure of the refrigerant in inlet header 114 may be higher than the pressure of the refrigerant in distribution header 116. Orifices 124 may collectively act as a restriction orifice in order to achieve a controlled or desired flow of the refrigerant from the inlet header 114 to the distribution header 116. Orifices 124 may restrict the flow of refrigerant from the inlet header 114 to the distribution header 116 by creating a permanent pressure loss between the inlet header 114 to the distribution header 116. The collective area of the orifices 124 determines the rate of refrigerant flow through the orifices 124. The refrigerant may flow around the circumference of the distribution header 116 to the microchannels that extend along the first cylinder 102.

First cylinder 102 may include protrusions 126, 128 located at the ends of first cylinder 102. Protrusions 126, 128 may provide an interference fit with second cylinder 104 in order to contain the refrigerant between first cylinder 102 and second cylinder 104.

Figure 4:
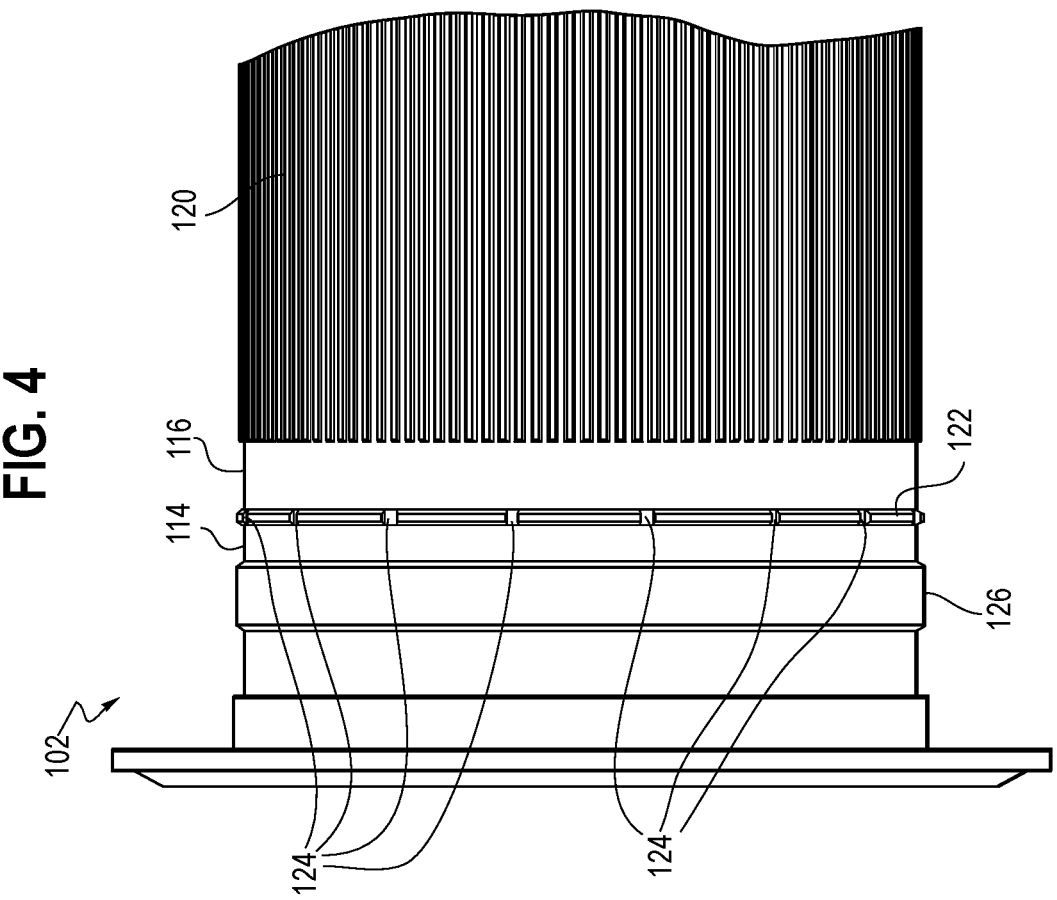
FIG. 4 is another side view of a component of an embodiment of a microchannel freezing cylinder assembly.

FIG. 4 is a closer view of one end of first cylinder 102. FIG. 4 shows inlet header 114, distribution header 116, grooves 120, ridge 122, and orifices 124. FIG. 4 shows that the orifices 124 may be spaced circumferentially around ridge 122. The orifices 124 may be spaced evenly around ridge 122 or may be spaced unevenly around ridge 122 in order to optimize and/or even out the distribution of refrigerant into distribution header 116 and into the microchannels. In some embodiments, there may not be an orifice 124 located directly adjacent to inlet opening 106 in order to prevent a large amount of refrigerant flowing from inlet opening 106 into an orifice 124 located directly adjacent to inlet opening 106.

Figure 5:
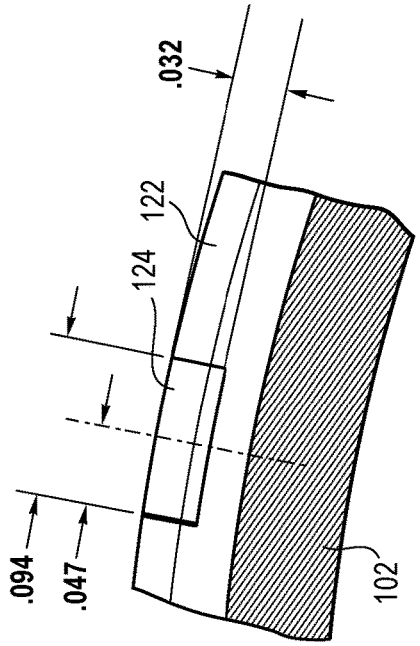
FIG. 5 is a detail view of a component of an embodiment of a microchannel freezing cylinder assembly.

FIG. 5 shows a detail view of a single orifice 124 with exemplary dimensions. Orifices 124 may be sized to collectively provide a desired cross-sectional area to allow refrigerant to flow from inlet header 114 to distribution header 116. Each orifice 124 may be generally rectangular in shape, as shown in FIG. 5. In other embodiments the orifice(s) may be other shapes, such as triangular, curved (such as circular, semicircular or partially circular, or other geometrical or arbitrary shapes), as long as the remaining material forming the ridge 122 makes contact with the inner surface of the second cylinder 104 to prevent refrigerant from flowing across the ridge 122 other than through the orifices 124 The depth and width of each orifice 124 may be varied as necessary to achieve the desired cross-sectional area, and one of ordinary skill with a thorough review of this disclosure will be able to design the number and size of orifices upon the ridge 122 without undue experimentation, as well as the other geometrical and numerical aspects of the inner cylinder. For example, the depth of each orifice 124, shown as 0.032 inches in FIG. 5, may be approximately half the depth of ridge 122, or in other embodiments about ¼, ⅓, or over half of the height of the ridge. As another example, the depth of each orifice 124 may be the depth of ridge 122 and each orifice 124 may be half, or ¼, ⅓, or over half of the width of the orifice. One of ordinary skill, after a thorough review and understanding of this specification and the appended figures, will readily comprehend that the relative size and relative dimensions of the orifice is a function of the number of orifices provided as well as the desired differential pressure across the ridge 122, and one of ordinary skill in the art would be able to design the desired orifices 124 to achieve the desired flow characteristics without undue experimentation. The depth and/or width of each orifice 124 may be selected for ease of manufacturability. For example, the width of each orifice 124, shown as 0.094 inches in FIG. 5, may be determined by the width of a tool, such as a drill bit, used to create each orifice 124 and the depth of each orifice 124 can be adjusted to achieve the desired cross-sectional area. As can be understood, in embodiments where the inner cylinder is machined, the depth and width of the orifice may have a lower bounds based upon the diameter of the drill bits or other tools available to machine these features.

Figure 6:
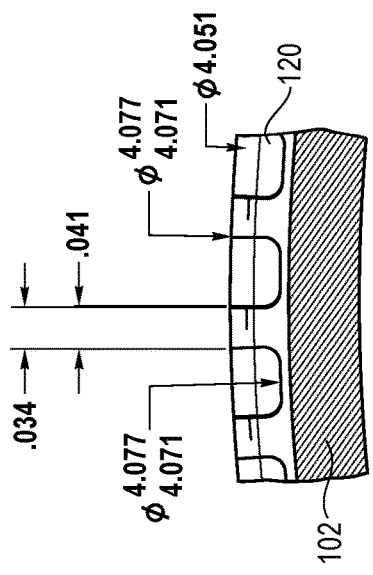
FIG. 6 is a detail view of a component of an embodiment of a microchannel freezing cylinder assembly.

FIG. 6 shows a detail view of grooves 120. Grooves 120 may have a gear-tooth profile, as shown in FIG. 6, as opposed to a square profile. Exemplary dimensions for the gear-teeth are shown in the table in FIG. 6. Using a gear-tooth profile instead of a square profile for grooves 120 may ease the manufacture of grooves 120. In some embodiments, the grooves 120 may be manufactured with the use of a hobbing machine. Using a gear-tooth profile may also increase the strength of the microchannels by providing a wider base of the sides of grooves 120 at the exterior of first cylinder 102 than if a square profile were used. In other embodiments, grooves with other profiles, such as square, triangular, trapezoidal, or arcuate and the like may be used. One of ordinary skill in the art with a thorough review of the subject specification and figures would appreciate that other grooves would be sufficient provided that they provided sufficient surface area for the needed heat transfer between the first cylinder 102 and the refrigerant and in conjunction allowed for a sufficient flow rate through the plurality of grooves based upon the supply pressure to the assembly 100, and provided that the outer edges of the grooves make sufficient contact with the inner surface of the second cylinder 104 to prevent refrigerant from flowing out of the grooves as it flows across the first cylinder. One of ordinary skill in the art would be able to establish a suitable geometry, size, and number of grooves with only routine optimization and without undue experimentation.

In other embodiments, depicted schematically in FIGS. 8-15, the construction of portions of the first and second cylinders 102a, 104a may be reversed, with the second cylinder 104a still disposed coaxially over the first cylinder 102a and with coolant flowing across the outer surface of the first cylinder 102a between inlet and outlet openings 106a, 108a and with the semi-frozen product flowing through the chamber between the first and second openings 110a, 112a. (In this embodiment, components of similar functionality and structure are noted with consistent element numbers as the corresponding structure discussed above and depicted in FIGS. 1-6 with a letter modifying the element number. For the sake of brevity, the structure and function of such components, to the extent that it is the same as the embodiment above, will not be described in this embodiment, but any material differences in components is discussed herein).

In this embodiment, the outer surface of the first cylinder 102a may be a smooth cylindrical surface, with the inner surface of the second cylinder 104a comprising structures that form an inlet header 114a, protrusions 126a, 128a, ridge 122a (and orifices 124a) and grooves 120a that form microchannels 121a. The radial tips of these features contact and form an interference fit with the outer surface of the first cylinder 102a to establish the flow of refrigerant through the assembly 100a and to prevent flow from bypassing these features (opposite to the embodiments below where the radial tips of these features—as shown in FIGS. 1-6 contact the inner surface of the second cylinder 104. Otherwise the structure of first and second cylinders 102a, 104a and the components upon the inner surface of the second cylinder 104a are constructed in a like manner with the structure of the first and second cylinders 102, 104 discussed above.

Figure 7:
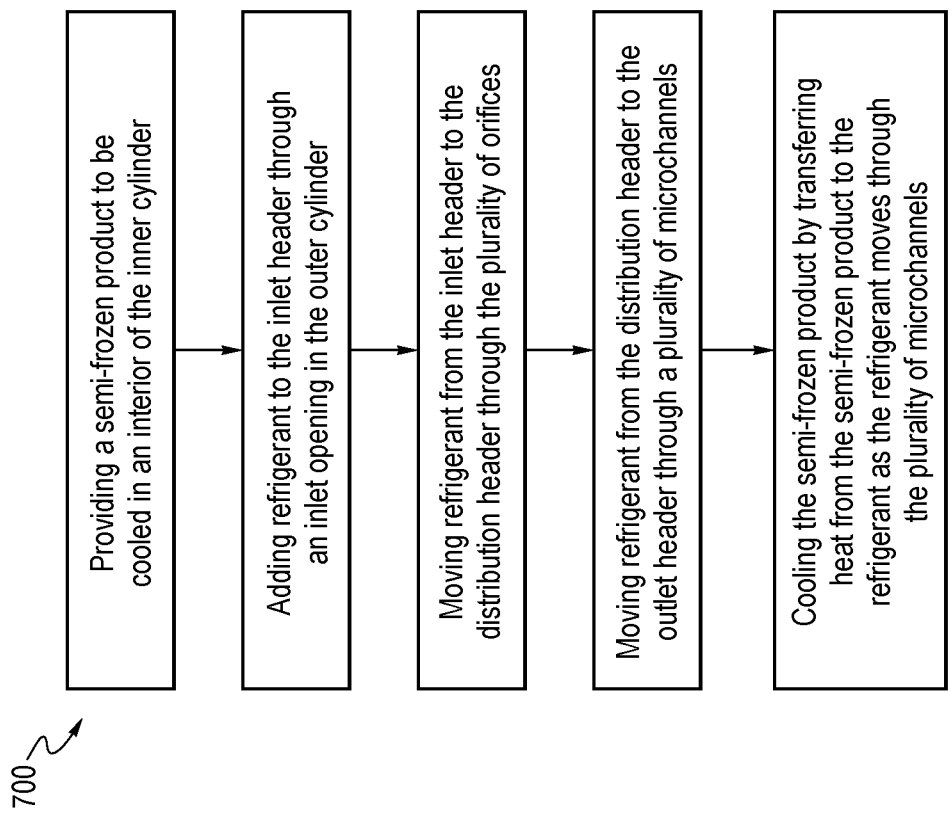
FIG. 7 is a diagram depicting a method operating an embodiment of a microchannel freezing cylinder assembly.
Figure 8:
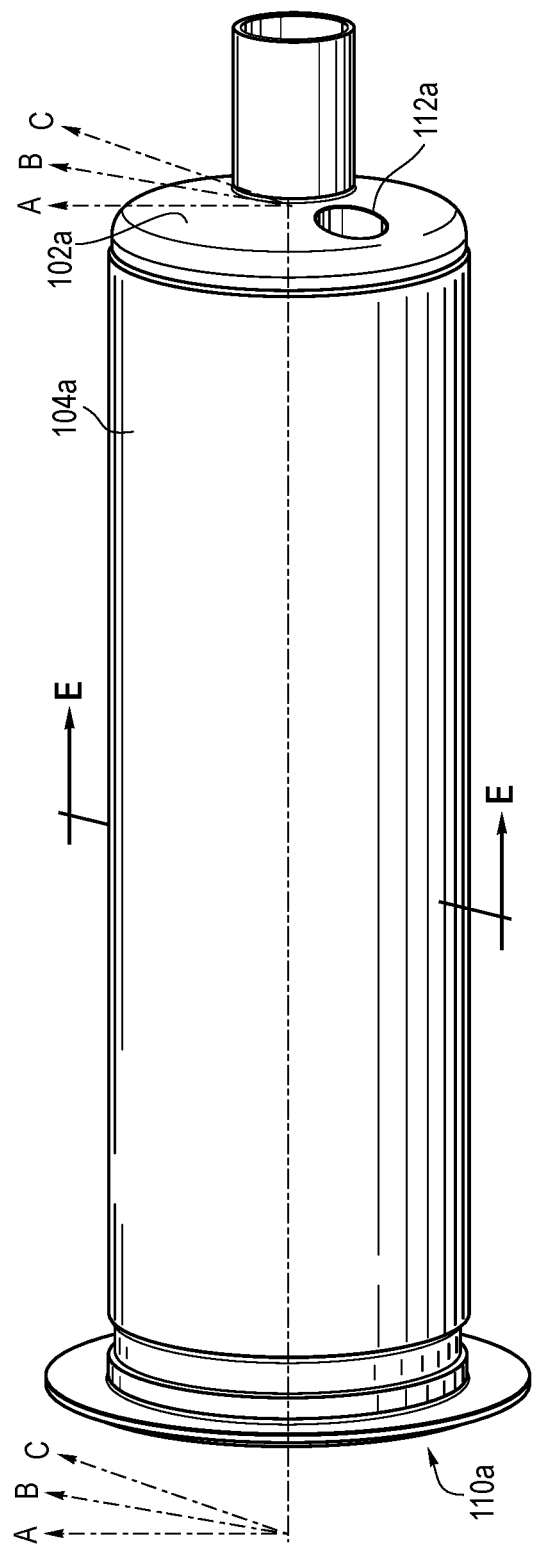
FIG. 8 is a perspective view of another embodiment of a microchannel freezing assembly.

FIG. 7 shows a method 700 of using the microchannel freezing cylinder assembly 100. Step 702 involves providing a semi-frozen product to be cooled in an interior of the inner cylinder. Step 704 adds refrigerant to the inlet header through an inlet opening in the outer cylinder. Step 706 moves refrigerant from the inlet header to the distribution header through the plurality of orifices. Step 708 moves refrigerant from the distribution header to the outlet header through the plurality of microchannels. Step 710 cools the semi-frozen product by transferring heat from the semi-frozen product to the refrigerant as the refrigerant moves through the plurality of microchannels.

While certain embodiments have been described, it should be understood that the disclosure is not so limited, and modifications may be made without departing from the disclosure herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the disclosure, and it is not necessarily expected that all of the described advantages will be achieved with every embodiment of the disclosure. The scope of the disclosure is defined by the appended claims, and all devices and methods that come within the meaning of the claims, either literally or by equivalence, are intended to be embraced therein.

The invention claimed is:

1. A freezing cylinder for use in a semi-frozen product dispensing apparatus, the freezing cylinder comprising:
   an inner cylinder having an inlet end and an outlet end;
   an outer cylinder having an inlet end and an outlet end, wherein the outer cylinder is disposed coaxially over the inner cylinder;
   a plurality of microchannels on an exterior surface of the inner cylinder that extend parallel with a longitudinal axis of the inner cylinder, wherein the plurality of microchannels are located between the inner cylinder and outer cylinder;
   a first inlet header around a circumference of the inner cylinder, wherein the first inlet header is located near the inlet end of the inner cylinder;
   a second inlet header around the circumference of the inner cylinder, wherein the second inlet header is located between the first inlet header and the plurality of microchannels, wherein the second inlet header is in fluid communication with the plurality of microchannels;
   a header ridge located between the first inlet header and the second inlet header, wherein the header ridge is configured to prevent fluid flow from the first inlet header to the second inlet header;
   a plurality of orifices in the header ridge that are configured to allow fluid flow from the first inlet header to the second inlet header; and
   an outlet header around the circumference of the inner cylinder, wherein the outlet header is located near the outlet end of the inner cylinder, wherein the outlet header is in fluid communication with the plurality of microchannels.

2. The freezing cylinder of claim 1, further comprising an inlet opening located in the outer cylinder that is in fluid communication with the first inlet header and an outlet opening located in the outer cylinder that is in fluid communication with the outlet header, wherein the inlet opening and outlet opening are located on opposite sides of a longitudinal axis of the outer cylinder.

3. The freezing cylinder of claim 2, wherein the inlet opening faces in a first direction and the outlet opening faces in a generally opposite direction from the first direction.

4. The freezing cylinder of claim 2, wherein the inlet opening and the outlet opening each face in the same general direction.

5. The freezing cylinder of claim 3, wherein the inlet opening is located on a top of the outer cylinder and the outlet opening is located on a bottom of the outer cylinder.

6. The freezing cylinder of claim 2, wherein none of the plurality of orifices are in-line with the inlet opening along a longitudinal direction of the inner cylinder.

7. The freezing cylinder of claim 1, wherein the plurality of microchannels are in contact with the outer cylinder.

8. The freezing cylinder of claim 1, wherein the plurality of microchannels each have a geartooth profile.

9. The freezing cylinder of claim 1, wherein each of the plurality of orifices include four sides, wherein three of the sides are formed by the header ridge and one side is formed by an interior surface of the outer cylinder.

10. The freezing cylinder of claim 9, wherein a depth of each of the plurality of orifices is approximately half the height of the header ridge.

11. The freezing cylinder of claim 1, wherein each of the plurality of orifices are rectangular shaped.

12. The freezing cylinder of claim 11, wherein a depth of each of the plurality of orifices is approximately one third of a width of each of the plurality of orifices.

13. A method of cooling a product with the freezing cylinder of claim 1, the method comprising:
providing a product to be cooled in an interior of the inner cylinder;
adding refrigerant to the first inlet header through an inlet opening in the outer cylinder;
moving refrigerant from the first inlet header to the second inlet header through the plurality of orifices;
moving refrigerant from the second inlet header to the outlet header through the plurality of microchannels; and
cooling the product by transferring heat from the product to the refrigerant as the refrigerant moves through the plurality of microchannels.

14. A freezing cylinder for use in a semi-frozen product dispensing apparatus, the freezing cylinder comprising:
a first cylinder having an inlet end and an outlet end;
a second cylinder having an inlet end and an outlet end, wherein the second cylinder is disposed coaxially over the first cylinder;
a plurality of microchannels on an interior surface of the second cylinder that extend parallel with a longitudinal axis of the second cylinder, wherein the plurality of microchannels are located between the first cylinder and second cylinder;
a first inlet header around an inner circumference of the second cylinder, wherein the first inlet header is located near the inlet end of the second cylinder;
a second inlet header around the inner circumference of the second cylinder, wherein the second inlet header is located between the first inlet header and the plurality of microchannels, wherein the second inlet header is in fluid communication with the plurality of microchannels;
a header ridge located between the first inlet header and the second inlet header and extending from the inner surface of the second cylinder, wherein the header ridge is configured to prevent fluid flow from the first inlet header to the second inlet header;
a plurality of orifices in the header ridge that are configured to allow fluid flow from the first inlet header to the second inlet header; and
an outlet header around a circumference of the first cylinder, wherein the outlet header is located near the outlet end of the second cylinder, wherein the outlet header is in fluid communication with the plurality of microchannels.

15. The freezing cylinder of claim 14, further comprising an inlet opening located in the second cylinder that is in fluid communication with the first inlet header and an outlet opening located in the second cylinder that is in fluid communication with the outlet header, wherein the inlet opening and outlet opening are located on opposite sides of a longitudinal axis of the second cylinder.

16. The freezing cylinder of claim 15, wherein the inlet opening faces in a first direction and the outlet opening faces in a generally opposite direction from the first direction.

17. The freezing cylinder of claim 15, wherein the inlet opening and the outlet opening each face in the same general direction.

18. The freezing cylinder of claim 16, wherein the inlet opening is located on a top of the second cylinder and the outlet opening is located on a bottom of the second cylinder.

19. The freezing cylinder of claim 15, wherein none of the plurality of orifices are in-line with the inlet opening along a longitudinal direction of the first cylinder.

20. The freezing cylinder of claim 14, wherein the plurality of microchannels are in contact with the first cylinder.

21. The freezing cylinder of claim 14, wherein the plurality of microchannels each have a geartooth profile.

22. The freezing cylinder of claim 14, wherein each of the plurality of orifices include four sides, wherein three of the sides are formed by the header ridge and one side is formed by an exterior surface of the first cylinder.

23. The freezing cylinder of claim 22, wherein a depth of each of the plurality of orifices is approximately half the height of the header ridge.

24. The freezing cylinder of claim 1, wherein each of the plurality of orifices are rectangular shaped.

25. The freezing cylinder of claim 24, wherein a depth of each of the plurality of orifices is approximately one third of a width of each of the plurality of orifices.

* * * * *